US009225889B1

(12) United States Patent
Korkin

(10) Patent No.: US 9,225,889 B1
(45) Date of Patent: Dec. 29, 2015

(54) PHOTOGRAPHIC IMAGE ACQUISITION DEVICE AND METHOD

(71) Applicant: Entropix, Inc., La Canada, CA (US)

(72) Inventor: Mikhail Korkin, Glendale, CA (US)

(73) Assignee: ENTROPIX, INC., La Canada, CA (US)

( * ) Notice: Subject to any disclaimer, the term of this patent is extended or adjusted under 35 U.S.C. 154(b) by 0 days.

(21) Appl. No.: 14/828,503

(22) Filed: Aug. 17, 2015

Related U.S. Application Data

(60) Provisional application No. 62/038,801, filed on Aug. 18, 2014.

(51) Int. Cl.
| | | |
|---|---|---|
| H04N 5/225 | (2006.01) | |
| G06K 9/32 | (2006.01) | |
| H04N 5/349 | (2011.01) | |

(52) U.S. Cl.
CPC ............. *H04N 5/2258* (2013.01); *H04N 5/349* (2013.01)

(58) Field of Classification Search
CPC ...................................................... G06T 3/4061
USPC ................................ 348/135, 222.1; 382/300
See application file for complete search history.

(56) References Cited

U.S. PATENT DOCUMENTS

| | | | |
|---|---|---|---|
| 5,949,914 A | 9/1999 | Yuen | |
| 6,476,865 B1 | 11/2002 | Gindele et al. | |
| 7,199,348 B2 | 4/2007 | Olsen et al. | |
| 7,769,229 B2 | 8/2010 | O'Brien et al. | |
| 7,826,685 B2 | 11/2010 | Riley et al. | |
| 7,830,430 B2 | 11/2010 | Adams, Jr. et al. | |
| 7,835,594 B2 | 11/2010 | Riley et al. | |
| 7,889,921 B2 | 2/2011 | Morales et al. | |
| 8,115,825 B2 | 2/2012 | Culbert et al. | |
| 8,319,822 B2 | 11/2012 | McClatchie | |
| 8,320,712 B2 | 11/2012 | Choi et al. | |
| 8,471,918 B2 | 6/2013 | Imada | |
| 8,487,996 B2 * | 7/2013 | Mann et al. .......... | G01C 11/025 348/135 |
| 8,581,995 B2 | 11/2013 | Lin et al. | |
| 8,619,082 B1 | 12/2013 | Ciurea et al. | |
| 8,711,452 B2 | 4/2014 | Hamilton, Jr. et al. | |
| 8,854,420 B2 | 10/2014 | McClatchie | |
| 8,913,145 B2 | 12/2014 | Griffith et al. | |
| 9,020,256 B2 | 4/2015 | Deskevich et al. | |
| 2007/0103595 A1 | 5/2007 | Gong et al. | |
| 2009/0110285 A1 | 4/2009 | Elad et al. | |
| 2012/0044328 A1 | 2/2012 | Gere | |

(Continued)

FOREIGN PATENT DOCUMENTS

WO      WO 2014/083489      6/2014

OTHER PUBLICATIONS

Buades, "A Non-Local Algorithm for Image Denoising," Computer Vision and Pattern Recognition, 2:60-65, 2005.

(Continued)

*Primary Examiner* — Joel Fosselman
(74) *Attorney, Agent, or Firm* — Cislo & Thomas, LLP

(57) ABSTRACT

A photographic image acquisition device comprising a primary image sensor optically coupled to a primary imaging lens and at least one secondary image sensor optically coupled to a secondary imaging lens, the optical axes of the primary and the secondary lenses set parallel to each other, both image sensors set in the same geometric plane, such that both focal planes arrays receive optical projections of the same scene.

29 Claims, 3 Drawing Sheets

(56) References Cited

U.S. PATENT DOCUMENTS

| | | |
|---|---|---|
| 2012/0086850 A1 | 4/2012 | Irani et al. |
| 2012/0268623 A1 | 10/2012 | Morel et al. |
| 2014/0036112 A1 | 2/2014 | Scarff |
| 2014/0118569 A1 | 5/2014 | Griffith et al. |
| 2014/0192238 A1 | 7/2014 | Attar et al. |
| 2014/0267759 A1 | 9/2014 | Leonard |
| 2014/0368681 A1 | 12/2014 | Gustavsson et al. |
| 2015/0036014 A1 | 2/2015 | Lelescu et al. |
| 2015/0036015 A1 | 2/2015 | Lelescu et al. |
| 2015/0085174 A1 | 3/2015 | Shabtay et al. |
| 2015/0109468 A1 | 4/2015 | Laroia |
| 2015/0109482 A1 | 4/2015 | Laroia |
| 2015/0109484 A1 | 4/2015 | Laroia |
| 2015/0109524 A1 | 4/2015 | Laroia |
| 2015/0116547 A1 | 4/2015 | Laroia |
| 2015/0117332 A1 | 4/2015 | Li et al. |
| 2015/0124083 A1 | 5/2015 | Attar et al. |

OTHER PUBLICATIONS

Glasner et al., "Super-Resolution from a Single Image," Computer Vision, IEEE 12th International Conference, 349-356, 2009.

Protter et al., "Generalizing the Nonlocal-Means to Super-Resolution Reconstruction," IEEE Transactions on Image Processing, vol. 18, No. 1, Jan. 2009.

Xu, et al., "Deep Convulutional Neural Network for Image Deconvolution," Advances in Neural Information Processing Systems, 2014.

Yang, et al., "Fast Direct Super-Resolution by Simple Functions," ICCV, 2013.

* cited by examiner

PHOTOGRAPHIC IMAGE ACQUISITION DEVICE AND METHOD

CROSS-REFERENCES TO RELATED APPLICATIONS

This application claims the benefit of U.S. Provisional Patent Application Ser. No. 62/038,801, filed Aug. 18, 2014, which Applicant incorporates in its entirety by this reference.

BACKGROUND OF THE INVENTION

1. Field of the Invention

The present invention relates to photographic image acquisition devices and methods thereof, and in particular to still and video cameras comprising at least one imaging lens optically coupled to at least one image sensor comprising a focal plane array of photosensitive elements.

2. Description of the Related Art

Spatial resolution of photographic image acquisition devices is limited by the spatial resolution of the image sensor comprising a focal plane array of photosensitive elements, and the point spread function (optical blur) of the imaging lens optically coupled to the sensor.

There are two basic approaches to increasing the spatial resolution of the image sensor known from the prior art. The first is by raising the spatial density of the focal plane array, and the second is by increasing the optical format of the image sensor and the lens to accommodate a larger number of photosensitive elements.

The first approach requires size reduction of the photosensitive elements that causes a reduction in the number of photons collected by each photosensitive element per unit of time, and thus worsens the signal-to-noise ratio and the dynamic range of the image. Under the low light, the effective image resolution may drop due to the elevated image noise that drowns small image details, and due to an increased motion blur caused by a longer exposure time required to compensate for the elevated image noise. There is a hard physical limit on size reduction of the photosensitive elements imposed by light diffraction that has been already reached by the current sensor technology.

The second approach leads to an exponential cost increase of the image sensor due to an exponential dependency between the physical dimensions of the focal plane array and the fabrication cost. The same exponential cost increase applies to the corresponding large-format lenses.

As an alternative to sensor resolution improvements, known in the prior art are post-acquisition computational methods that increase spatial resolution of the images post-capture. One of such methods is pansharpening, the fusion of at least two images acquired by at least two separate image sensors: a higher-resolution panchromatic image sensor and a lower-resolution multi-spectral sensor. As an example, the multi-spectral image sensor may comprise Bayer color filter array deposited on top of its focal plane array, as practiced in the art.

In the prior art, pansharpening is generally considered as a global substitution of the luminosity component or an intensity component of the multi-spectral image with the higher-resolution panchromatic image. For the substitution to succeed, both images must be fully matched in scale and the field of view, and perfectly registered to each other globally and locally, with no parallax present. Historically, the pansharpening techniques have been developed for and applied in aerial and space imaging where the distance from the focal plane to the objects in the field of view is essentially infinite, and where the panchromatic image and the multispectral image are acquired sequentially while flying over the same land surface area, thus eliminating the parallax problem, so that both fields of view, the panchromatic and the multi-spectral, are fully matched and perfectly registered to each other globally and locally.

Also known in the art are pansharpening methods that admit a mismatch between the panchromatic and the multi-spectral images due to parallax, said methods comprising additional means for resolving said mismatch, for example, a light projection based depth of scene estimation device integrated into the photographic image acquisition device, and a related computational method as disclosed in U.S. Pat. No. 8,319,822, incorporated herein by this reference.

It would be evident to those skilled in the art that the task of pansharpening in the case of mismatched panchromatic and multi-spectral images is substantially complicated due to parallax and occlusions.

As yet another alternative to post-capture image resolution improvement, known in the art are computational methods collectively known as super-resolution image reconstruction, or super-resolution that aim at reverting the effects of blurring in the lens and downsampling in the focal plane array. In contrast to pansharpening, super-resolution does not fuse a separately acquired higher-resolution image with a lower-resolution image: it exploits the intrinsic properties of the lower-resolution image itself.

Early attempts at computational super-resolution reconstruction in the prior art relied on exploiting relative motion between the scene and the camera. By acquiring a sequence of multiple low-resolution images, each producing a generally different sub-pixel offset relative to the sampling grid of the image sensor due to motion, and then registering these multiple low-resolution images on a higher-resolution grid, attempts were made at reconstructing a single super-resolved image. However, said methods required precise sub-pixel motion estimation, which is generally hard to achieve when non-global motion is present, especially under image noise. Importantly, in the absence of relative motion between the scene and the camera, said techniques cannot produce any resolution improvement.

In a more recent computational approach to super-resolution in the prior art, the desired sub-pixel offsets analogous to the sub-pixel offsets caused by the relative motion between the camera and the scene are found to exist in the low-resolution image itself due to a property of nonlocal self-similarity and redundancy at the scale of small image patches. In natural images, multiple similar or substantially similar image patches are typically present at different locations in the same image, each patch comprising a small group of pixels, for example, a square of 9 by 9 pixels.

Because similar image patches at different image locations are a product of sampling similar areas of the scene by a finite-resolution sampling grid of the image sensor, said image patches generally comprise random sub-pixel offsets relative to the grid, and thus provide additional sub-pixel resolution information. By exploiting multiple similar patches found at different image locations, the effective resolution enhancement factor up to a factor of three in each of the two image dimensions may be achieved, corresponding to an increase of the effective pixel count by a factor of nine.

Also known are patch-based super-resolution methods that employ a database of examples of high-resolution images and their blurred and subsampled low-resolution copies. Said database of examples is utilized to extract a compact dictionary of pairs of low- and high-resolution image patches using a variety of learning techniques known in the art. Importantly, said dictionary of patch pairs is made substantially compact due to said property of self-similarity and redundancy at the scale of small image patches. A low-resolution image is then super-resolved using said dictionary of pairs.

In said example-based approach, the effective resolution enhancement factor may exceed that of the non-example based super-resolution approach, the approach based on sub-pixel sampling offsets. However, the super-resolved images may be less reliable in some applications because they are based on example-based predictions of what the high-resolution image might look like, as opposed to relying on the actual data present in the image itself.

Also known in the art are example-based super-resolution methods based on said patch-pair dictionary learning, while the number of entries in the dictionary is substantially reduced. Said dictionaries are composed of elementary patch atoms, such that any small image patch is closely approximated by a linear sum of a very small subset of these atoms. The ability to approximate any image patch by a linear sum of a few elementary atoms is due to a fundamental property of sparsity of natural images in certain mathematical domains known to those skilled in the art. The property of sparsity and the property of nonlocal self-similarity and redundancy at the patch scale are closely related. Sparse coding methods are known in the art for their high computational cost due to the combinatorial nature of identifying the best combination of patch atoms that matches a given patch.

Further, it is known from the prior art that similar image patches are found at different locations not only in the same image, but also in its downscaled copies created by blurring and subsampling of the image. This property of cross-scale nonlocal patch similarity is the basis of yet another example-based super-resolution method as disclosed in patent application US2012/0086850, incorporated herein by this reference, which in contrast to the other example-based methods does not require an external database of high-resolution images or the dictionary of patch pairs.

Said cross-scale method first locates a pair of similar patches A and B in the actual image and its downscaled copy, and then applies the coordinates of patch B in the downscaled copy as a pointer to a corresponding location in the actual (non-downscaled) image to extract a higher-resolution patch C corresponding to the downscaled patch B, which may not generally coincide with the location of patch A. Higher-resolution patch C is further used in formation of a super-resolved image on a pixel-by-pixel basis by applying C at the same location in the super-resolved image as the location of patch A in the actual image.

Importantly, the super-resolved image is thus formed using patches from locations in the actual image that are generally different from the "correct" locations in the unknown high-resolution image. However, due to the property of nonlocal self-similarity and redundancy at the scale of small patches this substitution produces visually acceptable results. When this example-based method is combined with the method based on sub-pixel sampling offsets, the combined result is further improved.

In order to achieve a higher-scale resolution enhancement while avoiding image artifacts, the above technique may be applied over multiple iterations with a gradual increase in the cross-scale factor and using the intermediate results as a starting point for the next iteration. An additional step of back-projection of the newly formed high-resolution image onto the low-resolution image via blurring and subsampling is known in the art as a means for verification, regularization, and error avoidance.

In the example-based methods, the degree of match depends on the choice of the database of examples used in dictionary learning, and the choice of the scale gap between the high- and low-resolution image pairs in the database. The smaller the scale gap is, and the closer the database of examples is to the category of images to be super-resolved, the higher is the match between the super-resolved image and the unknown high-resolution image. In particular, increasing the effective pixel count by a factor of four, may generally produce a close match between the reconstructed image and an unknown high-resolution image, while increasing the effective pixel count by a factor of sixteen or higher may not produce a meaningful result due to the predictive nature of the example-based methods.

Super-resolution image reconstruction involves not only the step of upsampling of the low-resolution image, but also a step of reversing the optical blur incurred in the process of the photographic acquisition of the low-resolution image. Reversing the blur requires an estimation of the point-spread function (PSF) of the imaging lens, which is generally unknown, but is typically assumed to have a Gaussian shape. Methods of blur kernel estimation are known in the prior art: as an example, one approach is based on inferring the blur kernel by maximizing the match between the low-resolution patches and their blurred and down-sampled higher-resolution matches found in the same image, as disclosed in "Nonparametric Blind Super-Resolution," a 2013 publication by Michaeli and Irani, incorporated herein by reference.

Importantly, post-capture computational super-resolution methods from the prior art as disclosed herein, are computationally expensive. In particular, the amount of computational power that would be required to perform such computations in real-time during image acquisition (as opposed to post-capture) exceeds by orders of magnitude the computational power typically available in most cameras, including high-end cameras used in certain military applications. Moreover, even if the sufficient computational power were available for a real-time super-resolution reconstruction, the additional bandwidth to transmit the super-resolved images and the additional storage space to record them would be impractical in many applications.

To summarize heretofore, known in the prior art are example-based approaches to super-resolution, as well as the non-example based ones that rely on sub-pixel offsets present in multiple similar image patches. At least one category of said example-based approaches relies on a database of high-resolution images and their blurred and subsampled low-resolution copies, while another relies on the examples found in the low-resolution image itself, with no external database used. The effective resolution enhancement factor is typically lower in the non-example based methods relative to the example-based methods, however the usage of the latter may be limited in some applications due to their predictive nature. In contrast to the super-resolution methods, the pansharpening methods rely on a separate higher-resolution image independently acquired by a panchromatic image sensor, but do not involve an increase of resolution beyond that of the panchromatic sensor.

Therefore, the main objective of the present invention is to provide a photographic image acquisition device and method thereof that raise the spatial resolution of the acquired images substantially beyond the individual capabilities of either the pansharpening approach or the super-resolution approach, and to advantageously produce a multiplicative effect on resolution enhancement unachievable by each of the two approaches separately. Said multiplicative effect is gained herein because the two components of the invention, the super-resolution reconstruction component and the pansharpening component, are made mutually interdependent through the property of nonlocal patch similarity and redundancy: without the panchromatic image, the super-resolution of the multi-spectral image by itself cannot achieve a high scaling factor, while the pansharpening by itself cannot reach beyond the resolution of the panchromatic sensor. It is another objective to provide a pansharpening method admitting a mismatch between the panchromatic and the multi-spectral images due to parallax without involving any additional hardware or methods for depth of scene estimation, as practiced in the art. It is yet another objective to reduce the computational burden, bandwidth and storage space typically required in managing extreme resolution images and video.

SUMMARY OF THE INVENTION

One photographic image acquisition device and system of the present invention comprises a primary image sensor optically coupled to a primary imaging lens and at least one secondary image sensor optically coupled to a secondary imaging lens, the optical axes of the primary and the secondary lenses set parallel to each other, both image sensors set in the same geometric plane, so that both focal planes arrays receive optical projections of the same scene. The device may further comprise computational means for pre-processing the images captured by the image sensors, encoding the images, recording the encoded images onto a storage medium, and means for optionally streaming the encoded images to a remote recorder or viewer over a computer network, or streaming over other means of data transmission, known in the art. Said device also may comprise computational means for decoding the recorded images, and joint post-processing of the decoded images to reconstruct the super-resolved images from the images acquired by the primary and secondary image sensors, said reconstructed images further re-encoded, recorded onto the storage medium, or optionally streamed to a remote recorder or viewer over a computer network or over other means of data transmission.

In a preferred embodiment, said joint post-processing reconstruction of the super-resolved images from the images acquired by the primary and secondary image sensors comprises a novel method of resolution enhancement involving fusion of the panchromatic and the multi-spectral images with a concurrent super-resolution reconstruction of the higher-resolution multi-spectral image exploiting nonlocal self-similarity and redundancy at the scale of small image patches between the panchromatic image and the multi-spectral image. In another embodiment, the self-similarity and redundancy at the scale of small patches between the panchromatic and the multi-spectral images, may be directed to parallax compensation between said images to enhance the properties of the images with or without a concurrent super-resolution reconstruction.

DESCRIPTION OF THE PREFERRED EMBODIMENTS

Figure 1:
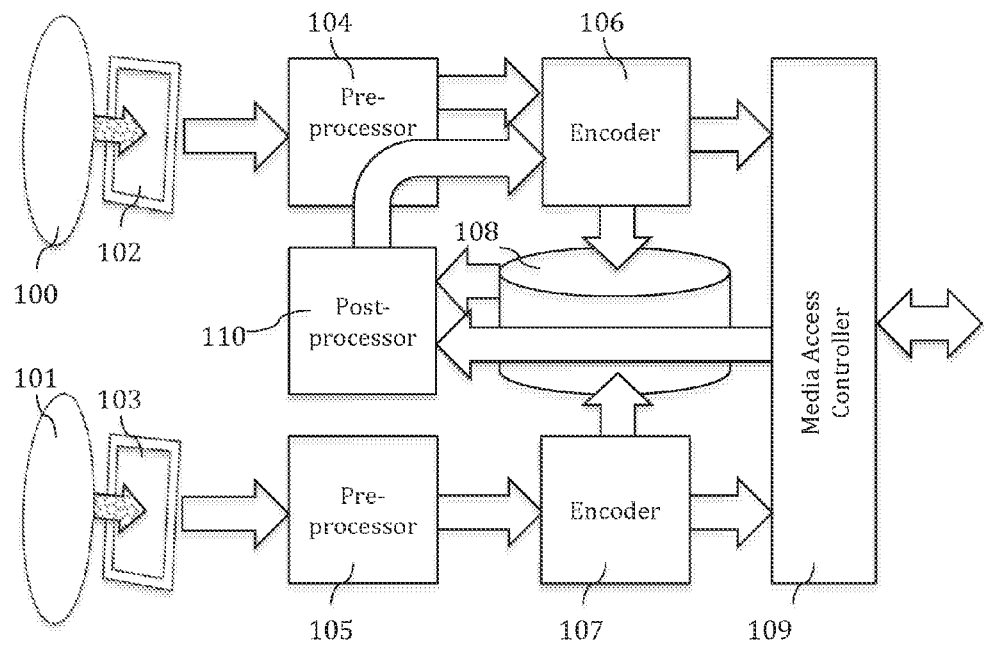
FIG. 1 is a diagram of a photographic image acquisition device in keeping with one embodiment of the present invention.

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

In the preferred embodiment, the photographic image acquisition device comprises a primary image sensor optically coupled to a primary imaging lens and at least one secondary image sensor optically coupled to a secondary imaging lens, the optical axes of the primary and the secondary lenses set parallel to each other, said image sensors set in the same geometric plane, such that their focal planes arrays receive optical projections of the same scene.

In one embodiment, the focal length of the primary lens is shorter than that of the secondary lens, and in another embodiment the primary lens is a fisheye lens that projects an optically warped image onto the focal plane of the primary image sensor.

In a preferred embodiment, the image sensors comprise identical focal plane arrays of identical photosensitive elements, except that the primary sensor is a multi-spectral image sensor comprising a Bayer color filter array deposited on top of its focal plane array, while the secondary image sensor or sensors are panchromatic. It would be evident to those skilled in the art that images from the primary multi-spectral image sensor are of a lower spatial resolution than the images from the secondary panchromatic image sensors due to spatial subdivision of the primary focal plane array into multiple overlapping spectral subcomponent arrays as determined by the Bayer array pattern.

It would be also evident, that the multi-spectral image sensor generally produces noisier images under limited illumination than the panchromatic image sensor due to the color filter array impeding light propagation from the lens to the focal plane array, and an infrared cut filter that is typically installed in front of the multi-spectral image sensor to prevent the infrared content of the scene from contaminating the spectral subcomponents.

In another embodiment, the resolution of the focal plane array of the secondary panchromatic image sensor is higher than that of the primary multi-spectral image sensor. In one embodiment, said resolution of the primary image sensor is further reduced due to a larger optical field of view as a consequence of a shorter focal length of the primary lens.

One preferred embodiment additionally comprises computational means for pre-processing the images captured by the image sensors, encoding the images, recording the encoded images onto a storage medium, and means for optionally streaming the encoded images to a remote recorder or viewer over a computer network, or streaming over other means of data transmission, known in the art.

Said pre-processing may comprise pixel defect correction, color interpolation, noise filtering, unsharp masking, color correction, white balance control, gamma correction, tone mapping, color space conversion, as well as other steps that may already be practiced in the prior art. Said encoding may comprise image compression and encoding of compressed images into one or more standard compression formats, such as H.264, H.265, JPEG, and the like. Said storage medium may comprise an SD memory card, a hard disk drive, a solid state drive, or the like. Said means for streaming the encoded images over a computer network may comprise an Ethernet transceiver, a WiFi transceiver, and the like.

In one embodiment, the secondary image sensor captures images at a different frame rate than the primary image sensor, or with a shorter exposure time, so that the scene content is further mismatched.

One embodiment also comprises computational means for decoding the recorded images acquired by the primary and the secondary image sensors, and a joint post-processing reconstruction of the super-resolved images from the images acquired by the primary and the secondary image sensors, said super-resolved images further re-encoded, recorded onto the storage medium, or optionally streamed to a remote recorder or viewer over a computer network or via other means of data transmission.

In the preferred embodiment, said decoding of the recorded images and joint post-processing reconstruction of the super-resolved images is performed by a remote post-processor that is not a part of the disclosed photographic image acquisition device. Said remote post-processor, as an example, may be a computer connected to the local area network as the disclosed photographic image acquisition device and receiving the images from said device, or a computer connected to a wide area network, or a specialized post-processor connected to the local or wide area network, or a post-processor connected directly to the disclosed image acquisition device, or the like.

In a preferred embodiment, said post-processing reconstruction of the super-resolved images is limited to a small zoomed region of interest, as opposed to the entire recorded image at full field of view, to advantageously reduce the computational cost, bandwidth and storage space required for the super-resolved image.

In such a preferred embodiment, said joint post-processing reconstruction of the super-resolved images comprises a novel method of resolution enhancement, said method involving fusion of the panchromatic and the multi-spectral images with a concurrent super-resolution reconstruction thereof, both the fusion and the super-resolution reconstruction exploiting nonlocal self-similarity and redundancy at the scale of small image patches Said method of resolution enhancement advantageously admits a mismatch between the two images due to parallax. In one embodiment, said method further admits a larger difference in the fields of view when the focal length of the primary imaging lens is shorter than that of the secondary lens. In another embodiment, said method advantageously admits a larger difference in image content when the frame rates or exposure times of the two image sensors are not identical, or if the panchromatic images are acquired asynchronously to the multi-spectral images.

Said method of resolution enhancement may comprise a first step, a second step, and a third step. The first step involves an initial crude estimate of the intended super-resolved image computed by the aforementioned post-processor by extracting the luminosity subcomponent from the multi-spectral image, and then by upsampling said luminosity subcomponent image to bring it up to the intended scale of the super-resolved image via Lanczos interpolation or a similar interpolation technique known in the art, for example, the bi-cubic interpolation, in one embodiment. Said luminosity pixel values are extracted from the multi-spectral image by using conventional techniques known in the art and comprising a weighted mixture of RGB subcomponent pixel values at known ratios, for example, at approximately 60% of green, 30% of red, and 10% of blue. Luminosity pixel values may be substituted in one embodiment with luma values that are extracted similarly except for the gamma correction of the RGB components.

In one embodiment, the luminosity patch may be processed using a pre-trained neural network to improve signal-to-noise ratio and resolution, and to reduce blurring, prior to matching of said patch with each of the plurality of the panchromatic patches. In this or other embodiments, the luminosity patch may be processed using a pre-trained neural network to improve the similarity between said luminosity patch and the panchromatic patches, prior to matching said patch with each of the plurality of the panchromatic patches, said neural network pre-trained using pairs of low and high resolution patches as practiced in the art.

During the second step of said method of resolution enhancement, for each pixel of said interpolated luminosity image, a small image patch surrounding said pixel is extracted, and a plurality of smaller image patches is extracted from the panchromatic image, such that the size of said interpolated luminosity patch and the size of each panchromatic patch are related by the same ratio as the respective sizes of the two images. Each patch of the plurality of extracted panchromatic patches is then upsampled to the same scale as the aforementioned interpolated luminosity patch via Lanczos interpolation or a similar interpolation technique known in the art, for example, the bi-cubic interpolation, in one embodiment, or alternatively said luminosity patch is downsampled to the same scale as the plurality of extracted panchromatic patches.

Upsampling of the plurality panchromatic patches to the scale of the luminosity patch or an alternative downsampling of the luminosity patch to the scale of panchromatic patches can be performed in a variety of ways known to those skilled in the art. In the preferred embodiment, the scale ratio is an integer value, for example 2 or 3, so that said downsampling is performed by decimation of the luminosity patch by a corresponding factor of 2 or 3 through averaging of accordingly 4 or 9 neighbor pixel values. In some embodiments where the scale ratio is non-integer, the process of decimation involves rescaling of the luminosity patch around a given center pixel down to the scale of the panchromatic patches by weighing groups of neighbor pixel values in proportion to their distance to the coarser grid nodes. Upsampling is performed through bilinear interpolation of the panchromatic patch, such that none of the existing pixel values are affected by interpolation, or by zero padding to avoid the introduction of the new pixel values altogether, or in some embodiments by a higher order interpolation technique that affects the existing pixel values as well.

In some embodiments, the plurality of panchromatic patches may contain patches extracted from panchromatic image rotated at a plurality of different angles in the image plane relative to the luminosity image, or may contain patches extracted from panchromatic image scaled at a plurality of different scale ratios relative to the upsampled luminosity image scale.

Each patch of said plurality of panchromatic patches brought to the same scale as the luminosity patch via upsampling or downsampling as disclosed heretofore is then matched against said luminosity patch using a measure of patch similarity, such as the Euclidian distance between the patches, or another similarity metric known in the art. A new pixel value is then composed of multiple pixel values at the centers of said panchromatic image patches by weighing their relative contributions in proportion to their similarity to said luminosity patch. Said new pixel value is then inserted into the interpolated luminosity image at the coordinates corresponding to the center of said interpolated luminosity patch to replace the original pixel value.

In some embodiments, the measure of patch similarity may involve local gradients of the first, second, and optionally higher orders.

Said second step is iterated over all pixels of said interpolated luminosity image to gradually replace all of its pixels to form a new higher-resolution image as an improved estimate of the intended super-resolved image in place of the initial crude estimate made prior to said second step.

The second step is further iterated multiple times over the entire image, each iteration forming a new high-resolution image as an improved estimate of the intended super-resolved image in place of the image formed at the previous iteration, and using said previous iteration image as the new estimate for the next iteration. The number of said iterations in the preferred embodiment to obtain the super-resolved image is at least two.

In the preferred embodiment, each of said iterations additionally involves a reversal of optical blur applied to each of the newly obtained estimates of the intended super-resolved image. The point-spread function (PSF) of the imaging lens, also known as the blur kernel, is generally unknown, but is typically assumed to have a Gaussian shape in the prior art. In one embodiment, the blur kernel is estimated using a calibration procedure involving acquisition of a test image by the photographic image acquisition device disclosed herein at two different distances corresponding to the ratio of the super-resolved image and the low-resolution image, and then minimizing the difference between said images by applying the blur kernel to the higher-resolution test image and down-sampling it, and iteratively modifying the kernel weights, said minimization in the preferred embodiment comprising the least squares method, or the like.

In the preferred embodiment, said plurality of panchromatic patches extracted in the second step is extracted not only from a given panchromatic image, but also from multiple temporally proximal panchromatic images (video frames) acquired shortly before and after the given image.

In one embodiment, due to the substantial similarity between the two fields of view, the luminosity image field of view and the panchromatic image field of view, the area of the panchromatic image for extracting the plurality of the panchromatic patches is limited to a close geometric proximity of a given luminosity image patch. In another embodiment, the extraction of said panchromatic patches is done at random, followed by a subsequent additional patch extraction near the most similar patches found initially, said sequence iterated multiple times until a sufficient number of similar patches is found.

The third step of said hybrid method is performed after said multiple iterations of the second step are completed, and comprises the upsampling of the chromaticity subcomponent images of the multi-spectral image to the scale of the super-resolved luminosity image via Lanczos interpolation or a similar interpolation technique known in the art, for example, the bi-cubic interpolation. It would be evident to those skilled in the art, that although the spatial resolution of the chromaticity subcomponents attained via interpolation is not increased, said resolution is not critical for visual perception of small image details of the super-resolved image as long as its luminosity subcomponent is super-resolved as disclosed heretofore.

To avoid any color drift as a result of the substitution of the original luminosity pixel values with the generally different panchromatic values, the chromaticity subcomponent pixel values of the multi-spectral image are further adjusted. Said adjustment of chromaticity values in the preferred embodiment is performed prior to said chromaticity subcomponent images interpolation by first down-sampling the super-resolved luminosity image down to the scale of the chromaticity images and adjusting said chromaticity at said scale.

In one embodiment, an additional optical blur reversal is performed on the chromaticity components using a default blur kernel as a generic model of the optical blur, for example, a Gaussian-shaped default kernel, or an estimated kernel from the blur kernel estimation procedure as disclosed heretofore.

It will be evident to those skilled in the art that the degree of patch similarity between the two images, the panchromatic and the multi-spectral, in the disclosed embodiment would be generally higher than the degree of similarity with patches extracted from an external database of example images since both image sensors of the disclosed herein image acquisition device capture a substantially similar scene content under the identical illumination conditions, and since both images are similarly pre-processed and encoded as disclosed heretofore.

In one embodiment where the primary lens is a fisheye lens that projects an optically warped image onto the focal plane of the primary image sensor, the similarity at the patch level is still high if the fisheye lens produces a conformal stereographic projection, after adjusting for local rotation and scaling factor for each patch.

In one embodiment, the secondary image sensor coupled to the secondary lens is mounted on a motorized pan-and-tilt mechanism to acquire multiple images throughout a larger field of view of the primary image sensor, said acquisition performed at a substantially slower frame rate than the frame rate of the primary sensor. In yet another embodiment, the secondary lens is a motorized varifocal or a motorized parfocal lens to allow changes of the field of view and the corresponding resolution of the resultant images.

The novelty of the present invention is that unlike the pansharpening methods in the prior art, image fusion is no longer treated as a global substitution of the luminosity or intensity of the multi-spectral image with the higher-resolution panchromatic image. For such substitution to succeed, both images are required to be fully matched in scale and the field of view, perfectly registered to each other globally and locally, with no parallax present. In contrast, the present invention employs nonlocal self-similarity and redundancy at the patch level, and thus does not depend on a perfect global and local correspondence between said images, and advantageously eliminates the no-parallax requirements.

Further, the novelty of the present invention is that the disclosed method comprises super-resolution image reconstruction performed concurrently with image pansharpening to advantageously achieve a large multiplicative resolution enhancement factor. Said multiplicative effect is gained herein because the two components of the invention, the super-resolution reconstruction component and the pansharpening component, are made mutually interdependent through the property of nonlocal patch similarity and redundancy: without the panchromatic image, the super-resolution of the multi-spectral image by itself cannot achieve a high scaling factor, while the pansharpening by itself cannot reach beyond the resolution of the panchromatic sensor. As an illustrative example, in the case of a multi-spectral sensor and a panchromatic sensor comprising identical arrays of photosensitive elements and the multi-spectral sensor comprising Bayer color filter, and further assuming the effective computational super-resolution factor relative to the panchromatic image resolution is two in each dimension, then the multiplicative factor of the disclosed method is 3.5 in each dimension, or an effective increase in image pixel density of over 12.

Certain embodiments of the disclosed invention may be used for video surveillance systems, including land-based, vehicle-based, and airborne surveillance. Such systems may be employed to aid in the imaging and detection of facial features, lettering, manmade versus natural phenomena, etc. The systems may be a low-cost, low-weight, small-sized payload camera, while a remote post-processor may be employed to produce the computationally super-resolved images that are similar or superior in image resolution as previously achievable only in high-cost, heavy-weight, larger-size video capture systems.

While the embodiments disclosed herein may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the scope of the disclosure. The block diagram of the disclosed photographic image acquisition device is shown in FIG. 1. The primary lens 100 is optically coupled to the primary image sensor 102, a multi-spectral sensor, and the secondary lens 101 is optically coupled to the secondary image sensor 103, a panchromatic sensor.

The images acquired by primary sensor 102 are pre-processed by the pre-processor 104, and the images acquired by the secondary sensor 103 are pre-processed by the pre-processor 105. Said pre-processing may comprise conventional image processing steps known in the art, including pixel defect correction, color interpolation, noise filtering, unsharp masking, color correction, white balance control, gamma correction, tone mapping, color space conversion, as well as other steps as practiced in the prior art.

The images pre-processed by pre-processors 104 and 105 are encoded by encoder 106 and 107, respectively. Said encoding may comprise image compression and encoding of the compressed images into one or more standard compression formats, such as H.264, H.265, JPEG, and the like. Encoded images are further recorded onto the storage medium 108, said storage medium may comprise an SD memory card, a hard disk drive, a solid state drive, or the like. Optionally, the encoded images are streamed over a computer network or over other means of data transmission to a remote recorder or viewer by the media access controller 109, or an Ethernet controller, a wireless network adapter, and the like means of data streaming over a computer network.

The recorded images are optionally retrieved from the storage medium 108 into the post-processor 110 for decoding and joint post-processing to produce super-resolved images. In the preferred embodiment only a small region of interest is retrieved from storage medium 108 and super-resolved by the post-processor 110, as opposed to the entire image at full field of view. The super-resolved images are further re-encoded by encoder 106 and optionally recorded onto storage medium 108 or streamed over a computer network or over other means of data transmission to a remote recorder or viewer by the media access controller 109.

In one embodiment, the encoded images are retrieved from the remote recorder and streamed over the computer network back to the disclosed photographic image acquisition device via media access controller 109 to be decoded and post-processed by the post-processor 110 to produce a super-resolved image. In another embodiment, the joint post-processing of images to produce a super-resolved image is performed by a remote post-processor (not shown in FIG. 1) that receives the encoded images from the disclosed image acquisition device over the computer network via media access controller 109, or the like means of data transmission.

Figure 2:
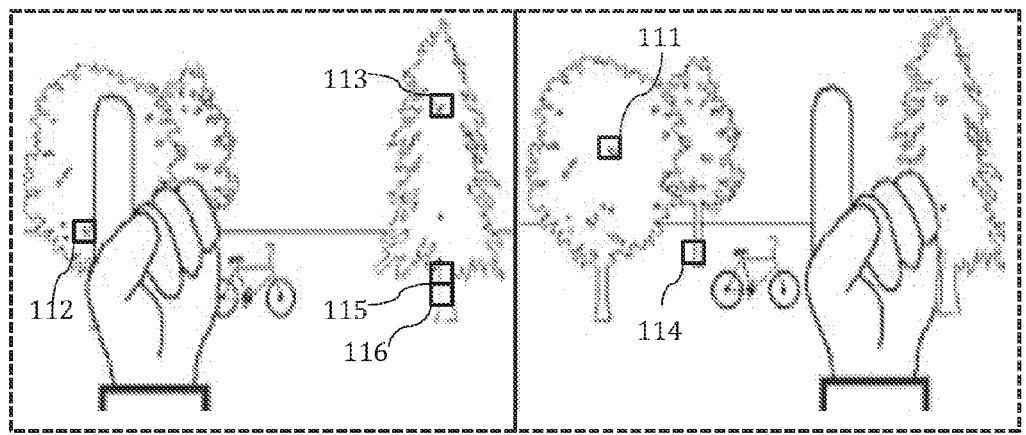
FIG. 2 is a depiction of a panchromatic image on the left and a luminosity component of the multi-spectral image on the right in keeping with one embodiment of the present invention showing a mismatch due to parallax.

FIG. 2 is an illustration of two images acquired by the disclosed photographic image acquisition device: on the left is the panchromatic image, on the right is the luminosity component of the multi-spectral image depicted in FIG. 2 at the same scale. FIG. 2 shows that the panchromatic image does not perfectly match the luminosity image due to parallax. FIG. 2 shows small image patch 111 in the luminosity image that is occluded in the panchromatic image due to a parallax, however there are multiple similar patches 112 and 113 found in the panchromatic image that are used in fusion and super-resolution reconstruction as disclosed herein. Additionally FIG. 2 shows image patch 114 in the luminosity image that is occluded in the panchromatic image due to parallax, however there are multiple similar patches 115 and 116 found in the panchromatic image that are used in fusion and super-resolution reconstruction as disclosed herein. The scale relationship between the size of small image patches and the entire field of view depicted in FIG. 2 is overstated for illustration purposes, and is not representative of the actual scale relationship.

Figure 3:
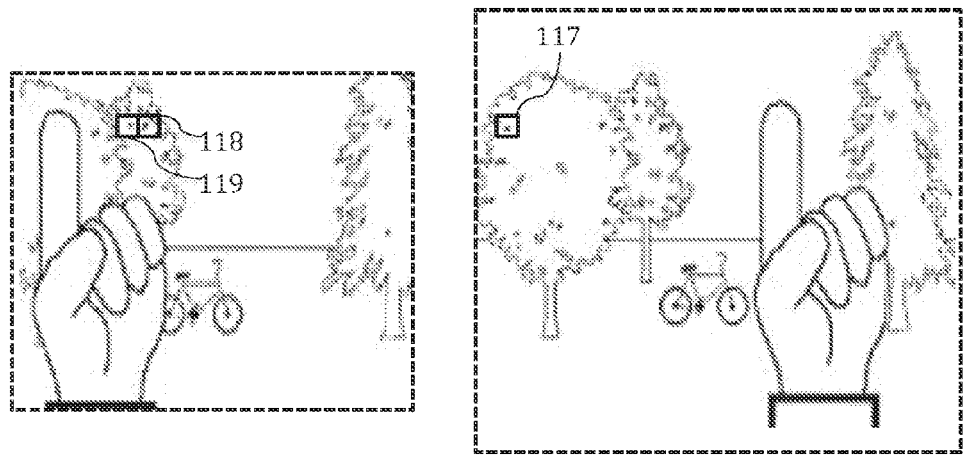
FIG. 3 is a depiction of a panchromatic image on the left that is smaller than the field of view of the luminosity component of the multi-spectral image on the right in keeping with one embodiment of the present invention.

FIG. 3 is a depiction of images acquired in one of the embodiments where the field of view of the panchromatic image on the left is smaller than the field of view of the luminosity component of the multi-spectral image on the right. Patch 117 in the luminosity image has no corresponding region in the panchromatic image due to the difference in the fields of view, however, there are multiple similar patches 118 and 119 found in the panchromatic image that are used in fusion and super-resolution reconstruction as disclosed herein. The scale relationship between the size of small image patches and the entire field of view depicted in FIG. 3 is overstated for illustration purposes, and is not representative of the actual scale relationship.

Figure 4:
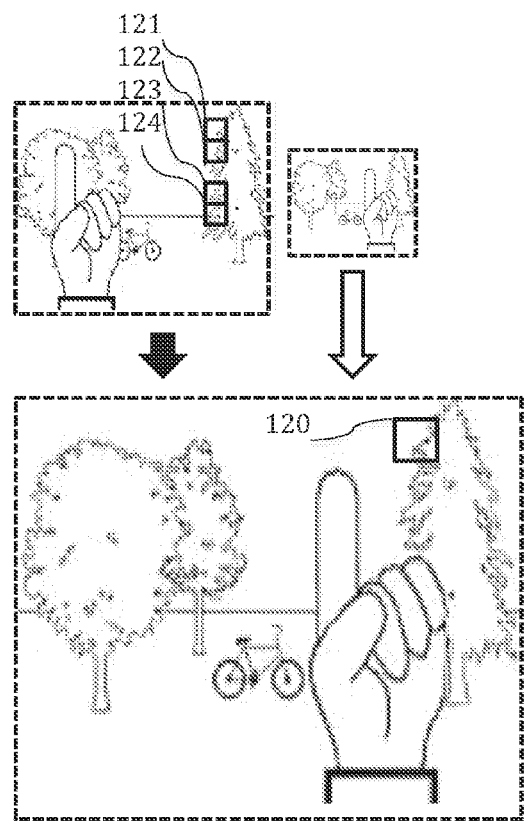
FIG. 4 is a diagram of one resolution enhancement method in keeping with the present invention in which the luminosity subcomponent image of the multi-spectral image on the right is approximately four times smaller than the panchromatic image on the left, images shown in proportion to the effective pixel count.
Figure 5:
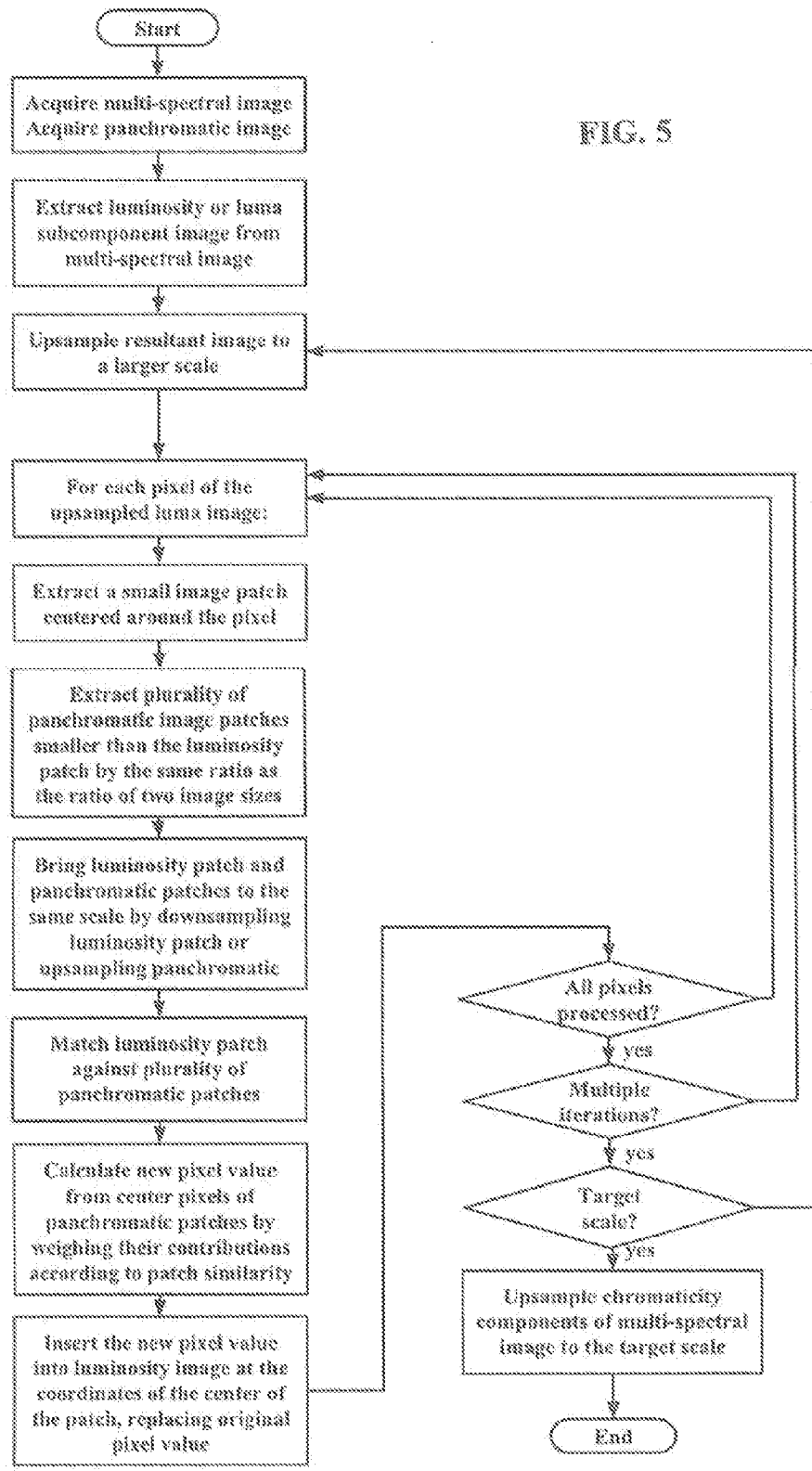
FIG. 5 is a flow chart illustrating one embodiment of an iterative method in keeping with the present invention.

FIG. 4 is an illustration of the disclosed method of resolution enhancement. The white arrow represents the upsampling of the low-resolution luminosity subcomponent image of the multi-spectral image to the intended scale of the super-resolved image by Lanczos interpolation, or by another interpolation technique known in the art, for example, the bi-cubic interpolation, said upsampling being an initial crude estimate of the intended super-resolved image at the target scale, and the black arrow represents the super-resolution reconstruction of the interpolated luminosity image using nonlocal similarity and redundancy of small image patches in the panchromatic image and said interpolated luminosity image.

The scale relationships between images depicted in FIG. 4 represent the difference in effective pixel count relative to the field of view. The luminosity subcomponent image shown in FIG. 4 on the right is shown approximately four times smaller than the panchromatic image shown on the left to reflect the scenario in the preferred embodiment where both image sensors comprise an identical array of photosensitive elements while the multi-spectral image sensor comprises the Bayer color filter array that reduces its effective pixel count relative to the panchromatic sensor by an approximate factor of at least 1.75 in each dimension due to color interpolation.

Also shown in FIG. 4 are patch 120 in the interpolated luminosity image and the plurality of similar patches 121, 122, 123, 124 in the panchromatic image that are approximately four times smaller than patch 120 as disclosed heretofore. The scale relationship between the size of small image patches and the entire field of view depicted in FIG. 4 is overstated for illustration purposes, and is not representative of the actual scale relationship.

Also in FIG. 4 shown is the final super-resolved image with a super-resolution factor of approximately four (two in each dimension) relative to the panchromatic image. It would be evident to those skilled in the art that the resolution enhancement by approximately a factor of four employing nonlocal patch similarity and redundancy as disclosed herein is feasible under a variety of conditions. Resolution enhancement by approximately a factor of four relative to the panchromatic image as shown in FIG. 4 corresponds to an approximate factor of twelve relative to the luminosity image, and the multi-spectral image itself. Said resolution enhancement factor may be achievable by the present invention as disclosed heretofore, however the range of said resolution enhancement may be limited by the signal-to-noise-ratio of the image, the scene content, and other variables, known to those skilled in the art.

Another embodiment of the present invention comprises a similar iterative method directed to parallax compensation in photographic multi-aperture image acquisition systems. The embodiment may comprise a primary aperture and one or more secondary apertures optically projecting substantially the same scene onto the primary and secondary digital image sensors, the apertures being identical or non-identical in regards to their F-number, the lenses being identical or non-identical in regards to their focal length, the image sensors being identical or non-identical in regards to their resolution, spectral characteristics, or sensitivity.

The parallax compensation may be needed where, for example, the data from the sensors are used to produce an enhancement of one or more of image characteristics of the primary image, such as potentially its resolution, dynamic range, signal-to-noise ratio, color, or low-light performance, is achieved via fusion of the primary aperture image with the secondary aperture image or images.

The embodiment may then comprise the steps discussed above, such as extracting an image patch surrounding each pixel of the primary aperture image and extracting a plurality of image patches from the secondary aperture image or images. Each patch of the plurality of secondary aperture image patches may then be matched against the primary aperture image patch using a measure of patch similarity, and a new pixel value may be calculated from multiple pixel values at the centers of the secondary aperture image patches by weighing their relative contributions in proportion to their similarity to the primary aperture image patch. The new pixel value is then inserted into the primary aperture image at the coordinates corresponding to the center of the primary aperture image patch thereby replacing the original pixel value at these coordinates.

In this embodiment, this process is then iterated over all pixels of the primary aperture image to gradually replace all of its pixels to form an enhanced fused image in place of the initial primary aperture image. Once the process is iterated over all pixels of the primary aperture image, the routine may be repeated one or more times over the entire primary image, using the previous iteration resultant image as the new starting point for the next iteration, each iteration thereby forming an improved fused image in place of the image formed at the previous iteration.

The iterations may involve a regularization step using Total Variation regularization or alternatively Tikhonov regularization. The iterations may additionally involve a reversal of optical blur applied to the newly obtained fused image. Optionally, the plurality of secondary aperture image patches may be extracted not only from a given secondary aperture image, but also from multiple temporally proximal images (video frames) acquired shortly before and/or shortly after the given image.

Moreover, the fusion of the primary and secondary aperture image or images may advantageously exploit nonlocal self-similarity and redundancy at the scale of small image patches between the primary and the secondary images, as discussed above with respect to other embodiments, thereby advantageously admitting mismatches between the images due to parallax, and advantageously eliminating the requirement of global or local registration of the images.

While the present invention has been described with regards to particular embodiments, it is recognized that additional variations of the present invention may be devised without departing from the inventive concept.

What is claimed is:

1. A photographic image acquisition method for increasing resolution of acquired images comprising:
   providing a primary image sensor optically coupled to a primary imaging lens having a primary optical axis,
   providing at least one secondary image sensor optically coupled to a secondary imaging lens having a secondary optical axis,
   wherein the primary and secondary image sensors comprise substantially identical focal plane arrays of substantially identical photosensitive elements, and wherein the primary image sensor is a multi-spectral image sensor comprising a Bayer color filter array deposited on top of its focal plane array, and the secondary image sensor is a panchromatic sensor, and
   wherein the primary and secondary optical axes are set substantially parallel to each other, and wherein the primary and secondary image sensors are set in substantially the same geometric plane such that their focal plane arrays receive optical projections of substantially the same scene,
   acquiring multi-spectral images from the primary image sensor,
   acquiring panchromatic images from the secondary image sensor,
   exploiting nonlocal self-similarity and redundancy at the scale of small image patches between the multi-spectral and the panchromatic images in an iterative process to construct a super-resolved multi-spectral image, thereby advantageously admitting mismatches between the two images due to parallax, said iterative process comprising:
   performing an initial estimate of a super-resolved multi-spectral image having an intended scale by
   extracting a luminosity subcomponent image from the multi-spectral image, and
   upsampling said luminosity subcomponent image to bring it up to the intended scale of the super-resolved image, wherein luminosity pixel values are extracted from the multi-spectral image by using a mixture of spectral subcomponent pixel values at predetermined ratios, for each pixel of said upsampled luminosity subcomponent image, extracting a small image patch surrounding said pixel and extracting a plurality of smaller image patches from the panchromatic image, such that the size of said extracted luminosity patch and the size of each panchromatic patch are related by the same ratio as the respective sizes of the two images, upsampling each of the plurality of extracted panchromatic patches to the same scale as the aforementioned upsampled luminosity patch, or conversely downsampling said luminosity patch to the same scale as the plurality of extracted panchromatic patches, matching each patch of said plurality of panchromatic patches against said luminosity patch brought to the same scale as said plurality of panchromatic patches using a measure of patch similarity, calculating a new pixel value from multiple pixel values at the centers of said panchromatic image patches by weighing relative contributions of said multiple pixel values in proportion to their similarity to said luminosity patch, inserting said new pixel value into the upsampled luminosity image at the coordinates corresponding to the center of said luminosity patch thereby replacing the original pixel value at these coordinates, iterating over all pixels of said upsampled luminosity image to gradually replace all of its pixels to form a new higher-resolution image as an improved estimate of the intended super-resolved image in place of the initial estimate, repeating this iterating step one or more times over the entire super-resolved image, using said previous iteration image as a new estimate for the next iteration, each iteration thereby forming a new higher-resolution image as an improved estimate of the intended super-resolved image in place of the image formed at the previous iteration, and wherein one or more of said iterations additionally involves regularization using Total Variation regularization or Tikhonov regularization, wherein one or more of said iterations additionally involves a reversal of optical blur applied to the new estimate of the super-resolved image, and wherein said plurality of panchromatic patches may be extracted not only from a given panchromatic image, but also from multiple temporally proximal panchromatic images, upsampling a chromaticity subcomponent image from the multi-spectral image to the scale of the super-resolved image, and adjusting pixel values of the chromaticity subcomponent image to avoid color drift.

2. The method of claim 1, wherein the focal length of the primary imaging lens is shorter than the focal length of the secondary lens.

3. The method of claim 1, wherein the panchromatic images are acquired asynchronously to the multi-spectral images, or acquired at a different frame rate, or at a shorter exposure time to advantageously admit a larger difference in content between the panchromatic and multi-spectral images.

4. The method of claim 1, wherein, due to the substantial similarity between the field of view of the luminosity image and the field of view of the panchromatic image, the area of the panchromatic image for extracting the plurality of the panchromatic patches is limited to a close geometric proximity of a given luminosity subcomponent image patch.

5. The method of claim 1, wherein the extraction of said panchromatic patches is done at random, each extracted patch is compared to the luminosity subcomponent patch for similarity, subsequent panchromatic patches are extracted near the most similar patches found, and said sequence of comparing the extracted panchromatic patches to the luminosity subcomponent patch for similarity and subsequent panchromatic patch extractions near the most similar such patches is iterated multiple times until a sufficient number of similar patches is found.

6. The method in claim 1, wherein said luminosity patch is processed using a pre-trained neural network to improve the similarity between said luminosity patch and the panchromatic patches, to improve a signal-to-noise ratio and resolution, or to reduce blurring prior to matching said patch with each of the plurality of the panchromatic patches, said neural network pre-trained using pairs of low and high resolution patches.

7. The method in claim 1, wherein said plurality of panchromatic patches contains patches extracted from panchromatic image rotated at a plurality of angles relative to the luminosity image.

8. The method in claim 1, wherein said luminosity pixel values are modified via gamma correction to obtain luma values prior to said super-resolution image reconstruction.

9. A post-processing method for computationally reconstructing a super-resolved multi-spectral image from a primary image captured by a multi-spectral image sensor through a Bayer color filter array and a secondary image or images, said secondary image or images captured by at least one panchromatic image sensor situated on a substantially identical geometrical plane as that of the multi-spectral image sensor, wherein said reconstruction of a super-resolved multi-spectral image advantageously exploits nonlocal self-similarity and redundancy at a scale of small image patches between the primary and secondary images thereby advantageously admitting global and local mismatches between the primary and secondary images due to parallax, said computationally reconstruction comprising:

performing an iterative process beginning with an initial estimate of a super-resolved image, having an intended scale computed, by extracting luminosity subcomponent pixel values from the multi-spectral image by using a mixture of spectral subcomponent pixel values at predetermined ratios, upsampling a luminosity subcomponent image to bring it up to the intended scale of the super-resolved image, and for each pixel of said upsampled luminosity subcomponent image, extracting a small luminosity patch surrounding said pixel and extracting a plurality of smaller panchromatic patches from the panchromatic image, such that the size of said upsampled luminosity patch and the size of each panchromatic patch are related by the ratio of the respective sizes of the primary and secondary images, upsampling each of the plurality of extracted panchromatic patches to the same scale as the aforementioned upsampled luminosity patch, or conversely downsampling said luminosity patch to the same scale as the plurality of extracted panchromatic patches, matching each patch of said plurality of panchromatic patches against said luminosity patch brought to the same scale as said plurality of panchromatic patches using a measure of patch similarity, calculating a new pixel value from multiple pixel values at the centers of said panchromatic patches by weighing relative contributions of said multiple pixel values in proportion to their similarity to said luminosity patch, and inserting said new pixel value into the upsampled luminosity subcomponent image at the coordinates corresponding to the center of said upsampled luminosity patch thereby replacing the original pixel value at these coordinates, iterating over all pixels of said upsampled luminosity image to gradually replace all of its pixels to form a new high-resolution image as an improved estimate of the intended super-resolved image in place of the initial estimate, and wherein one or more of said iterations additionally involves regularization using Total Variation regularization or Tikhonov regularization, and reversing optical blur applied to the new estimate of the intended super-resolved image, and repeating this iterating process over the entire primary image using the previous iteration image as a new estimate for the next iteration thereby forming a new high-resolution image in place of the image formed from the previous iteration.

10. The method of claim 9, wherein the focal length of the primary lens is shorter than the focal length of the secondary lens.

11. The method of claim 9, wherein exposure times of the multi-spectral image sensor and the at least one panchromatic image sensor are not identical to advantageously admit a larger difference in image content between the primary and secondary images.

12. The method of claim 11, wherein said acquisition of images from the at least one panchromatic image sensor is performed at a substantially different frame rate than frame rate of the acquisition of images from the multi-spectral image sensor to advantageously admit a further mismatch of the image content.

13. The method of claim 9, wherein, further comprising upsampling a chromaticity subcomponent image from the multi-spectral image to the intended scale of the super-resolved image.

14. The method of claim 9, wherein, further comprising adjusting chromaticity subcomponent pixel values of the multi-spectral image to avoid color drift.

15. The method of claim 9, comprising computational means for recording the primary and secondary images onto a storage medium, or streaming said images to a remote recorder or viewer over a channel of communication in raw unencoded format or encoded format.

16. The method of claim 9, wherein said decoding of the recorded primary and secondary images and joint post-processing reconstruction of the super-resolved images is performed by a remote post-processor, said remote post-processor is a computer or a general purpose graphics processing unit connected to a local or wide area network or connected directly by other means of data transmission to said images sensors.

17. The method of claim 9, wherein the secondary images are acquired asynchronously to the primary images to advantageously admit a larger difference in image content between the primary and secondary images.

18. The method of claim 9, wherein, due to the substantial similarity between the field of view of the luminosity image and the field of view of the panchromatic image, the area of the panchromatic image for extracting the plurality of the panchromatic patches is limited to a close geometric proximity of a given extracted luminosity patch.

19. The method of claim 9, wherein the step of adjusting the chromaticity values is performed prior to said chromaticity subcomponent images interpolation by first down-sampling the super-resolved luminosity image down to the scale of the chromaticity images and adjusting said chromaticity values at that scale.

20. The method of claim 9, mounting the at least one panchromatic image sensor on a motorized pan-and-tilt mechanism to acquire multiple images throughout a larger field of view than the field of view of the multi-spectral image sensor, said acquisition performed at a substantially slower frame rate than the frame rate of acquisition performed by the multi-spectral sensor.

21. The method of claim 9, wherein a lens in the panchromatic image sensor is a motorized varifocal or a motorized parfocal lens to allow changes in the field of view.

22. The method of claim 9, wherein said plurality of panchromatic patches extracted in the second step is extracted not only from a given panchromatic image, but also from multiple temporally proximal panchromatic images.

23. The method of claim 9, wherein said reconstruction of the super-resolved multi-spectral image is limited to a small region of interest within the acquired multi-spectral image, thereby advantageously reducing the computational cost, bandwidth and storage space required for the super-resolved image.

24. The method in claim 9, wherein said luminosity patch is processed using a pre-trained neural network to improve the similarity between said luminosity patch and the panchromatic patch, to improve signal-to-noise ratio and resolution, or to reduce blurring prior to matching said patch with each of the plurality of the panchromatic patches, said neural network pre-trained using pairs of low and high resolution patches.

25. The method in claim 9, wherein said plurality of panchromatic patches contains patches extracted from panchromatic image rotated at a plurality of angles in the image plane relative to the luminosity image.

26. The method in claim 9, wherein said luminosity pixel values are modified via gamma correction to luma values prior to said super-resolution image reconstruction.

27. A method for parallax compensation in photographic multi-aperture image acquisition systems that comprises a primary aperture and one or more secondary apertures optically projecting a primary image and one or more secondary images onto a primary and one or more secondary digital image sensors, respectively, and wherein an enhancement of its resolution, dynamic range, signal-to-noise ratio, color, low-light performance, one or more other image characteristics of the primary image is achieved via fusion of the primary image with the secondary image or images, comprising:

extracting an image patch surrounding each pixel of the primary image or a subcomponent image thereof, said subcomponent image being selected from a group consisting of a luminosity image, a chromaticity image, and a spectral subcomponent image, extracting a plurality of image patches from the secondary image or images, or respective subcomponent images thereof, matching each of said plurality of secondary image patches against said primary image patch using a measure of patch similarity, calculating a new pixel value from multiple pixel values at the centers of said secondary image patches by weighing relative contributions of said multiple pixel values in proportion to their similarity to said primary image patch, inserting said new pixel value into the primary image at coordinates corresponding to the center of said primary image patch thereby replacing a original pixel value at said coordinates, iterating over all pixels of said primary image to gradually replace all of said pixels to form a fused image in place of the original primary image, repeating this iterating step one or more times over the entire primary image, using the fused image formed by the previous iteration as a new primary image for the next iteration, each iteration thereby forming an improved fused image in place of the fused image formed by the previous iteration, and wherein one or more of said iterations additionally involves regularization using Total Variation regularization or Tikhonov regularization, wherein one or more of said iterations additionally involves a reversal of optical blur applied to the new fused image, and wherein said plurality of secondary aperture image patches may be extracted not only from a given secondary aperture image, but also from multiple temporally proximal images, wherein said fusion of the primary and secondary image or images advantageously exploits nonlocal self-similarity and redundancy at a scale of small image patches between the primary and the secondary images, thereby advantageously admitting mismatches between said images due to parallax, and advantageously eliminating the need for a global or local registration of said images.

28. The method of claim 27, wherein said apertures being non-identical in regards to focal lengths of the lenses or F-number.

29. The method of claim 27, wherein said image sensors being non-identical in regards to their resolution, spectral characteristics, or sensitivity.

* * * * *